S. Clark,

Fly Wheel,

№ 24,600.   Patented June 28, 1859.

Witnesses.
Andrew C. Armstrong
Edward Scribner

Inventor.
Samuel Clark

UNITED STATES PATENT OFFICE.

SAMUEL CLARK, OF NEW YORK, N. Y., ASSIGNOR TO WILLIAM OLAND BOURNE, OF SAME PLACE.

MODE OF IMPARTING MOMENTUM MOTION TO A SIFTING APPARATUS.

Specification of Letters Patent No. 24,600, dated June 28, 1859.

*To all whom it may concern:*

Be it known that I, SAMUEL CLARK, of the city, county, and State of New York, have invented a new and improved mode of imparting a short, quick, or jarring motion to an apparatus designed for sifting minerals, ores, dry paints, shot, or other substances into different sizes or for machinery of any kind when such motion is desirable, which I hereby designate or name a "momentum motion;" and I do hereby declare that the following is a full and exact description thereof, reference being had to the accompanying drawings and to the letters of reference marked thereon.

The particular features of this invention are, first, an oscillating, vibrating, or reciprocating weight, to which a motive power is applied, and when it has acquired sufficient momentum or force, is brought in contact with an object or its attachment, to which it is desired to convey a short, quick motion or jar, and the motion of the weight being continuously reversed, produces the desired short, quick, or jarring motion to the said object; second, the manner of suspending an object to which the motion is designed to be applied, by means of concave and convex bearing parts, all the concave parts being uppermost and the convex parts undermost, by which the accumulation of dirt at said parts to interfere with their operation is prevented.

Figure 1:
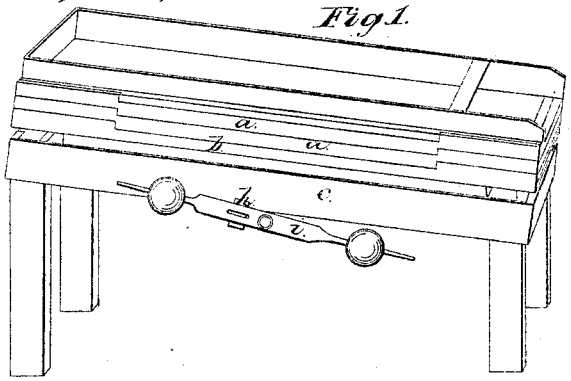
Figure 2:
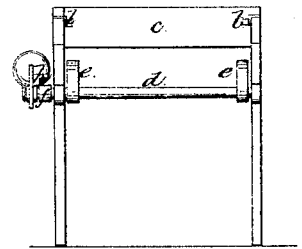
Figure 3:
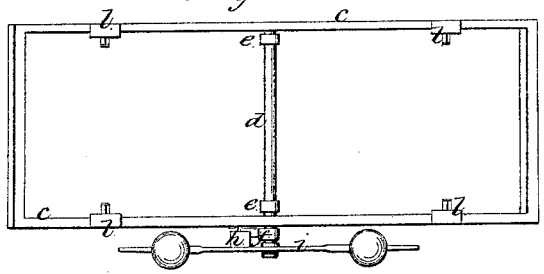
Figure 4:
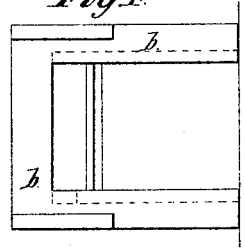
Figure 5:
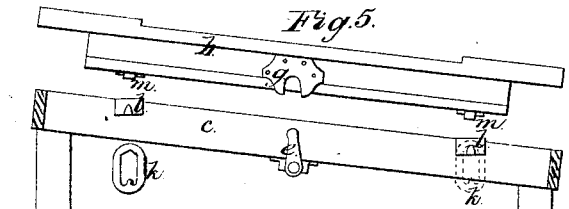
Figure 6:
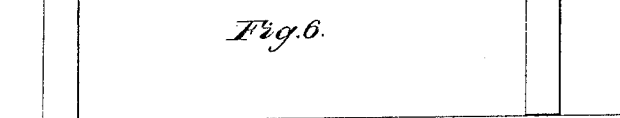
Figure 7:
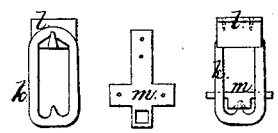
Figure 8:
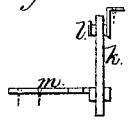

Figure 1 is a perspective view of the whole apparatus. Fig. 2 is a cross section of a table-frame $c$. Fig. 3 is a plan of the table-frame $c$. Fig. 4 is a plan of part of a supporting-frame $b$. Fig. 5 is a side elevation of the same. Fig. 6 is a longitudinal section of the table-frame $c$. Fig. 7 shows the details of the suspending links and bearing parts. Fig. 8 shows the lever-weight $i$, the dog $h$, and the lever $f$ in a reversed position from Fig. 1.

$b$ shows a support-frame which is suspended from the table-frame $c$ at $l$, by means of the connecting links $k$.

$d$ shows a shaft which oscillates in journal boxes $p$, attached to the table-frame $c$.

$e$, $e$, are two levers attached to the shaft $d$, the ends of which work in slots $g$, in castings attached to the suport-frame $b$, as shown at $q$, by which means motion is conveyed to the support-frame $b$ from the shaft $d$.

$f$ is a lever attached to the shaft $d$, the end of which works between the jaws of an adjustable dog $h$, which is connected to the lever-weight $i$, which oscillates at the end of the shaft $d$.

$a$ shows frames to which sieves are attached, which are supported and acted upon by the frame $b$.

The operation of the above is, that by regulating the position of the dog $h$ on the lever-weight $i$, so as to let the lever weight move a distance without moving the lever $f$, and then oscillating the lever-weight until the jaws of the dog come into contact with the end of the lever $f$, a short, quick, or jarring motion is imparted to the support-frame $b$ and its burden.

The upper ends of the links $k$ have concave bearing parts, as shown at $r$, which rest upon convex bearing parts shown at $l$, which are attached to the table-frame $c$, the lower ends of the links $k$ have convex bearing parts as shown at $n$, upon which rest concave bearing parts shown at $m$, which are attached to the support-frame $b$, and by which said frame is suspended.

What I claim as my invention and desire to secure by Letters Patent is,

1. The imparting a short, quick, or jarring motion to a sifting apparatus, or machinery of any kind where such motion is desirable, by means of an oscillating, vibrating or reciprocating weight, brought, at the end of its motion, into contact with the said apparatus or its attachments, the same being arranged and constructed in the manner above described at $d$, $e$, $f$, $h$, and $i$, or its equivalent.

2. Suspending the object to which the motion is applied, by means of a suspending or supporting link or rod, with concave bearing parts uppermost at both ends, and convex bearing parts undermost, constructed as above set forth at $l$, $m$, $n$, $k$, and $r$, or in an equivalent manner.

SAMUEL CLARK.

Witnesses:
WM. OLAND BOURNE,
W. L. CORTELYOU,
ANDW. C. ARMSTRONG.